(12) United States Patent
Noh

(10) Patent No.: US 6,924,065 B2
(45) Date of Patent: Aug. 2, 2005

(54) SEPARATORS FOR WINDING-TYPE LITHIUM SECONDARY BATTERIES HAVING GEL-TYPE POLYMER ELECTROLYTES AND MANUFACTURING METHOD FOR THE SAME

(75) Inventor: Hyeong-gon Noh, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 406 days.

(21) Appl. No.: 10/114,311

(22) Filed: Apr. 3, 2002

(65) Prior Publication Data

US 2002/0192561 A1 Dec. 19, 2002

(30) Foreign Application Priority Data

Apr. 7, 2001 (KR) ........................................ 2001-18471

(51) Int. Cl.⁷ ................................................ H01M 2/16
(52) U.S. Cl. ....................... 429/254; 429/247; 429/249; 429/253
(58) Field of Search .................... 429/142, 148, 429/163

(56) References Cited

U.S. PATENT DOCUMENTS

| | | | |
|---|---|---|---|
| 4,472,487 A | 9/1984 | Maxfield et al. | |
| 4,522,897 A * | 6/1985 | Walsh | 429/119 |
| 4,668,595 A | 5/1987 | Yoshino et al. | |
| 5,028,500 A | 7/1991 | Fong et al. | |
| 5,362,582 A * | 11/1994 | Chang et al. | 429/249 |
| 5,441,830 A | 8/1995 | Moulton et al. | |
| 5,460,904 A | 10/1995 | Gozdz et al. | |
| 5,540,741 A | 7/1996 | Gozdz et al. | |
| 6,617,078 B1 * | 9/2003 | Chia et al. | 429/316 |
| 6,699,623 B1 * | 3/2004 | Dai | 429/306 |

FOREIGN PATENT DOCUMENTS

JP            2001-84984            3/2001

* cited by examiner

*Primary Examiner*—Dah-Wei Yuan
(74) *Attorney, Agent, or Firm*—Stein, McEwen & Bui, LLP

(57) ABSTRACT

A porous separator for a winding-type lithium secondary battery having a gel-type polymer electrolyte includes a matrix made of polyvinyl chloride, or a matrix made of mixtures of polyvinylchloride and at least one polymer selected from the group consisting of polyvinylidenefluoride, a vinylidenefluoride/hexafluoropropylene copolymer, polymethacrylate, polyacrylonitrileand polyethyleneoxide.

6 Claims, 2 Drawing Sheets

SEPARATORS FOR WINDING-TYPE LITHIUM SECONDARY BATTERIES HAVING GEL-TYPE POLYMER ELECTROLYTES AND MANUFACTURING METHOD FOR THE SAME

CROSS-REFERENCE TO RELATED APPLICATION

This application claims the benefit of Korean Application No. 2001-18471, filed Apr. 7, 2001 in the Korean Industrial Property Office, the disclosure of which is incorporated herein by reference.

BACKGROUND OF THE INVENTION

1. Field of the Invention

The present invention relates to separators for winding-type lithium secondary batteries having gel-type polymer electrolytes and a manufacturing method for the same, and more particularly, to separators which can be used for winding-type lithium secondary batteries having gel-type polymer electrolytes prepared by immersing a monomer having good ionic conductivity in an electrolytic solution including a lithium salt and an organic solvent and thermally polymerizing the monomer, and a manufacturing method for the same.

2. Description of the Related Art

In general, a non-aqueous lithium secondary battery includes an anode, a lithium electrolyte prepared from a lithium salt dissolved in at least one organic solvent, and a cathode of an electrochemically active material, which is generally a transition-metal chalcogenide. During discharging, lithium ions generated from the anode release electrical energy, and simultaneously move through a liquid electrolyte to the electrochemically active material of the cathode that takes up the lithium ions. During charging, the flow of lithium ions is reversed so that the lithium ions are released from the cathode active material and returned to the anode through the liquid electrolyte to then be plated on the anode. Non-aqueous lithium secondary batteries are disclosed in U.S. Pat. Nos. 4,472,487, 4,668,595, 5,028,500, 5,441,830, 5,460,904 and 5,540,741, the disclosures of which are incorporated by reference.

To prevent the growth of dendrite and sponge lithium, a metallic lithium anode is replaced with a carbon anode. The carbon anode is made of a carbon material such as cokes or graphite, into which lithium ions are intercalated to form $Li_xC_6$. During the operation of such batteries, as also occurs in a battery having a metallic lithium anode, lithium ions are released from the carbon anode and move through an electrolyte to the cathode that takes up the lithium ions. During recharging, the lithium ions return to the anode to then be intercalated back into carbon. Since metallic lithium does not exist in the battery, the anode is seldom dissolved even under severe conditions. Also, since the lithium is recombined in the anode by intercalation and not by plating, dendrite or sponge lithium growth does not occur.

In the above-described lithium secondary battery manufactured using a carbon anode and a liquid electrolyte, a porous polyethylene film is typically used as a separator. The porous polyethylene film has a shutdown function at 140° C. and has excellent mechanical strength.

In recent years, lithium secondary batteries using porous polymer matrixes as separators have emerged to prove that the use of a porous polymer matrix can improve the ionic conductivity of a battery. One method of manufacturing the porous polymer matrix includes forming a polymer structure containing a plasticizer, such as dibutylphthalate, and forming pores in the polymer structure by removing the plasticizer. Currently, the plasticizer is usually removed by extraction methods using an organic solvent such as dimethylether, methanol and cyclohexane.

Lithium secondary batteries using such porous polymer matrixes are generally prepared by stacking an anode, a cathode and a porous polymer matrix interposed therebetween, and laminating the stack. However, according to this method, the porous polymer matrix is liable to break during winding. Thus, conventional manufacturing facilities for winding-type lithium ion batteries cannot be used for manufacturing the secondary batteries having a porous matrix.

To overcome this problem, lithium secondary batteries containing a gel-type polymer electrolyte have most recently been manufactured by preparing a jelly-roll type battery precursor comprising an anode, a cathode and a separator interposed therebetween as also done in the conventional lithium ion battery preparation method. A liquid electrolyte and a monomer having good ionic conductivity are added to the jelly-roll type battery precursor and, finally, thermally polymerizing the resultant structure.

The porous polyethylene films that have been used in preparation of conventional lithium ion batteries are still typically being used as separators for the lithium secondary batteries having the gel-type polymer electrolyte. However, the porous polyethylene films are disadvantageously expensive.

SUMMARY OF THE INVENTION

To solve the above and other problems, it is therefore an object of the present invention to provide novel separators for winding-type lithium secondary batteries having gel-type polymer electrolytes, and a manufacturing method for the same.

Additional objects and advantages of the invention will be set forth in part in the description which follows and, in part, will be obvious from the description, or may be learned by practice of the invention.

To accomplish the above and other objects, a porous separator for a winding-type lithium secondary battery having a gel-type polymer electrolyte according to an embodiment of the invention includes a matrix made of polyvinyl chloride, or a matrix made of mixtures of polyvinylchloride and at least one polymer selected from the group consisting of polyvinylidenefluoride, a vinylidenefluoride/hexafluoropropylene copolymer, polymethacrylate, polyacrylonitrile and polyethyleneoxide.

In the porous separator according to an aspect of the present invention, the matrix further includes an inorganic filler capable of increasing mechanical strength and ionic conductivity of the separator.

According to another aspect of the invention, the matrix further includes $Al_2O_3$ or $Li_2CO_3$ so as to be capable of increasing high-rate charge/discharge capacity and battery performance at low temperatures.

According to another embodiment of the present invention, a method of preparing a porous separator for a winding-type lithium secondary battery having a gel-type polymer electrolyte includes dissolving a plasticizer with either polyvinyl chloride, or mixtures of polyvinylchloride and at least one polymer selected from the group consisting of polyvinylidenefluoride, a vinylidenefluoride/hexafluoropropylene copolymer, polymethacrylate, polyacrylonitrile and polyethyleneoxide in a solvent for casting to provide a resultant product, casting the resultant product on a support body, drying the cast resultant product to remove the solvent used for casting, and forming a film on the support body, and separating the film from the support body.

According to an aspect of the invention, the plasticizer is at least one selected from the group consisting of ethylene carbonate, propylene carbonate, dimethyl carbonate, diethoxyethane, dibutylphthalate, dimethoxyethane, diethyl carbonate, dipropyl carbonate and vinylidene carbonate.

According to a further aspect of the invention, the method further includes dispersing an inorganic filler capable of increasing a mechanical strength and an ionic conductivity of the separator in the solution of the resultant product.

According to a yet further aspect of the invention, the method further includes dispersing $Al_2O_3$ or $Li_2CO_3$ to be capable of increasing a high-rate charge/discharge capacity and a battery performance at low temperatures, in the solution of the resultant product.

According to a still further aspect of the invention, the method further includes dispersing an inorganic filler capable of increasing a mechanical strength and an ionic conductivity of the separator, and $Al_2O_3$ or $Li_2CO_3$ so as to be capable of increasing a high-rate charge/discharge capacity and a battery performance at low temperatures, in the solution of the resultant product.

According to an additional aspect of the invention, the method further includes forming pores by extracting the plasticizer by immersing the film in a plasticizer extracting solvent.

BRIEF DESCRIPTION OF THE DRAWINGS

The above and other objects and advantages of the present invention will become more apparent and more readily appreciated by describing in detail preferred embodiments thereof with reference to the accompanying drawings in which.

DETAILED DESCRIPTION OF THE EMBODIMENTS

Figure 1:
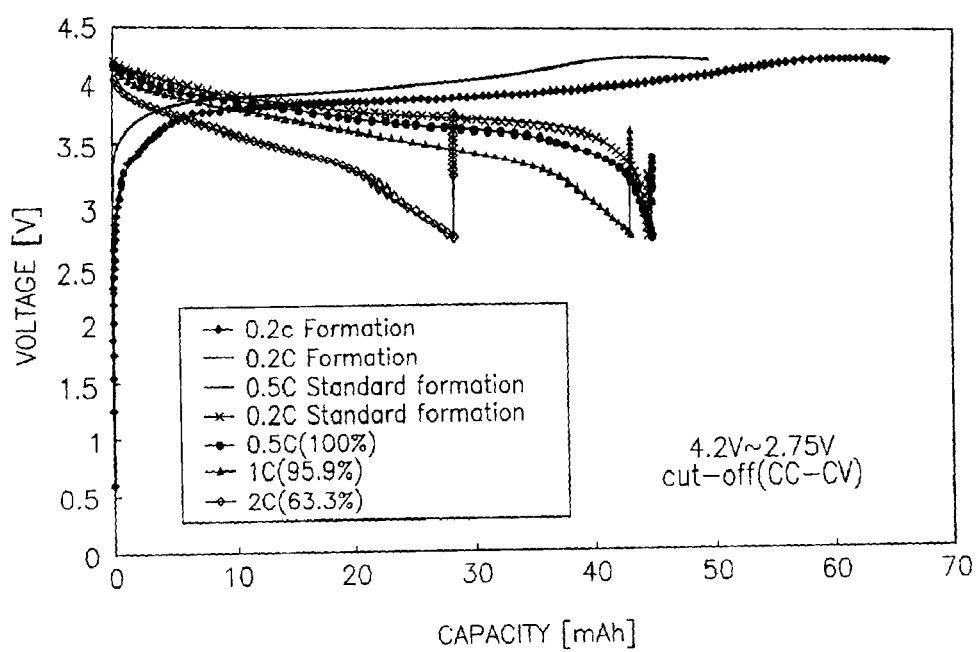
FIG. 1 is a graph showing charging/discharging characteristics of lithium secondary batteries using separator films according to Example 9 of an embodiment of the present invention, at various battery rates and temperatures.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Separators according to the present invention and manufacturing methods of the same will now be described in detail.

Figure 2:
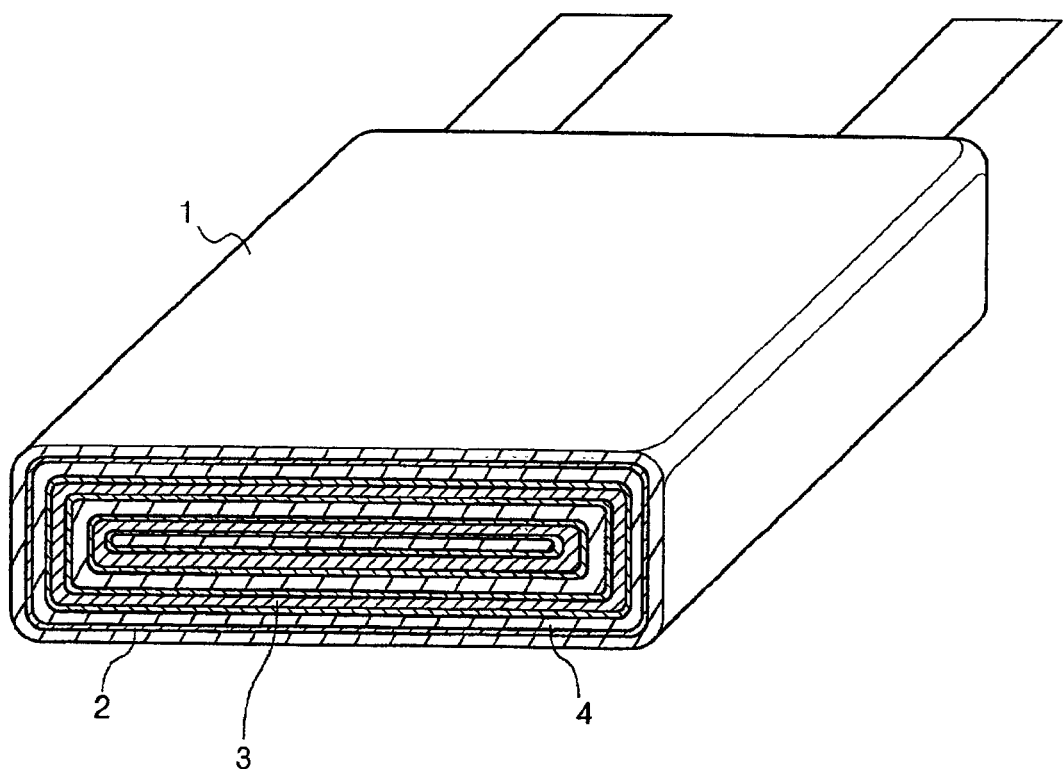
FIG. 2 is a perspective view of a lithium secondary battery according to an embodiment of the present invention.

A separator 2 according to the present invention is used for a winding-type lithium secondary battery containing gel-type polymer electrolytes, such as the lithium battery shown in FIG. 2. The separator 2 is prepared by dissolving a plasticizer and either polyvinyl chloride, or mixtures of polyvinylchloride and at least one polymer selected from the group consisting of polyvinylidenefluoride, vinylidenefluoride/hexafluoropropylene copolymer, polymethacrylate, polyacrylonitrileand polyethyleneoxide in an organic solvent for casting. The solvent is tetrahydrofuran or N-methylpyrrolidone according to an embodiment of the invention. The resultant polymer solution is cast onto an appropriate support body to a predetermined thickness. The organic solvent used for casting is removed by drying. Finally, the separator is separated from the support body.

According to an embodiment of the invention, the plasticizer is at least one selected from the group consisting of ethylene carbonate, propylene carbonate, dimethyl carbonate, diethoxyethane, dibutylphthalate, dimethoxyethane, diethyl carbonate, dipropyl carbonate and vinylidene carbonate.

The separator may or may not have pores formed therein according to embodiments herein. If the pores are formed in the separator, the pores are formed by extracting the plasticizer using an extractable organic solvent. Examples of the extractable organic solvent include acetone or ethyl ether. If the pores are not formed in the separator, since an electrolytic solution containing the same organic solvent as the organic solvent for the plasticizer is used, the plasticizer to be distributed in the separator is mixed with the organic solvent in the electrolytic solution, thereby substantially exhibiting the same porous effect as occurs where the pores are formed in the separator. Since the porosity is substantially adjusted by the amount of the plasticizer used, the amount of a plasticizer used is preferably adjusted according to a desired porosity. In particular, the plasticizer is used in an amount of 10–90 wt % based on the total weight of the separator according to an embodiment of the invention.

Also, if a separate extraction process for forming pores is not performed as in the latter embodiment, too much time is disadvantageously required for an electrolytic solution to be impregnated into the separator. However, the latter embodiment avoids potential cost and/or environmental contamination problems arising due to the extraction process.

According to an embodiment of the invention, the separator further includes an inorganic filler that improves the mechanical strength and the ionic conductivity of the separators. Suitable inorganic fillers include, without limitation, any filler that is generally known in the art to be usable as the inorganic filler, such as silica or fumed silica. Also, the amount of the inorganic filler used is not specifically limited, but is in the range 5–80 wt % based on the total weight of the separator according to another embodiment of the invention.

Further, the separators according to still another embodiment of the present invention further includes $Al_2O_3$ or $Li_2CO_3$ that improve a high-rate charge/discharge capacity and a battery performance at low temperatures.

According to a further embodiment, $Al_2O_3$ is added in an amount of 1–80 wt % based on the weight of the separator, and is coated on an anode active material to improve life cycle characteristics and high-rate capacity of the battery.

According to an additional embodiment, $Li_2CO_3$ is added in an amount of 1–80 wt % based on the weight of the separator, and is used as an additive to improve life cycle characteristics and high-rate capacity of the battery.

Porous separators according to the present invention and their manufacturing methods will now be described in detail using the following examples. However, it is understood that the invention is not limited to the embodiments discussed in the examples.

EXAMPLE 1

4 g of polyvinylchloride (PVC), having a weight-average molecular weight of 60,000, available from Aldrich Chemical Co., was dissolved in 20 mL of tetrahydrofuran. 6 g of ethylene carbonate was added thereto, followed by homogenously mixing to form a resultant solution. Subsequently, the resultant solution was cast on a Mylar film to a thickness of 30 μm using a doctor blade. Next, the cast resultant product was dried using hot moving air to remove the tetrahydrofuran to form a dried PVC film. The dried PVC film was removed from the Mylar film, thereby preparing a separator according to an embodiment of the present invention.

EXAMPLE 2

A separator according to an embodiment of the present invention was prepared by the same method as in Example 1, except that 3 g of $Al_2O_3$ was further added to and dispersed in a solution prepared by dissolving the PVC in the tetrahydrofuran.

EXAMPLE 3

3 g of the PVC having a weight-average molecular weight of 60,000 was dissolved in 40 mL of the tetrahydrofuran. 3 g of fumed silica and 6 g of ethylene carbonate were added thereto, followed by homogenously mixing to form a resultant solution. Subsequently, the resultant solution was cast on a Mylar film to a thickness of 30 μm using a doctor blade. Next, the cast resultant product was dried using hot moving air to remove the tetrahydrofuran to form a dried PVC film. The dried PVC film was removed from the Mylar film, thereby preparing a separator according to another embodiment of the present invention.

EXAMPLES 4–6

The PVC films prepared in Examples 1–3 were dipped in methanol. Ethylene chloride was then extracted from the dipped PVC films to form pores, thereby preparing a separator according to additional embodiments of the present invention.

EXAMPLE 7

4 g of the PVC having a weight-average molecular weight of 60,000 and 2 g of KYNAR 2801 (a vinylidenefluoride 78 wt %/hexafluoropropylene 22 wt % copolymer) were dissolved in 30 mL of N-methylpyrrolidon. 4 g of ethylene carbonate was added thereto, followed by homogenously mixing to form a resultant solution. Subsequently, the resultant solution was cast on a Mylar film to a thickness of 30 μm using a doctor blade. Next, the cast resultant product was dried using hot moving air to remove the N-methylpyrrolidon to form a dried film consisting of PVC and the vinylidenefluoride/hexafluoropropylene copolymer. The dried film was removed from the Mylar film, thereby preparing a separator according to a further embodiment of the present invention.

If using a mixture of the PVC and the vinylidenefluoride/hexafluoropropylene copolymer, the vinylidenefluoride/hexafluoropropylene copolymer are advantageously dissolved at 142° C. to have a shut-down function like that of polyethylene (PE).

EXAMPLE 8

2 g of the PVC having a weight-average molecular weight of 60,000 and 1 g of Kynar 2801 (a vinylidenefluoride 78 wt %/hexafluoropropylene 22 wt % copolymer) were dissolved in 40 mL of the N-methylpyrrolidon. 12 g of ethylene carbonate and 3 g of fumed silica were added thereto, followed by homogenously mixing to form a resultant solution. Subsequently, the resultant solution was cast on a Mylar film to a thickness of 30 μm using a doctor blade. Next, the cast resultant product was dried using hot moving air to remove the N-methylpyrrolidon and to form a dried film consisting of PVC and the vinylidenefluoride/hexafluoropropylene copolymer. The dried film was removed from the Mylar film, thereby preparing a separator according to a still further embodiment of the present invention.

EXAMPLE 9

1 g of the PVC having a weight-average molecular weight of 60,000 and 2 g of polyvinylidenefluoride (PVDF) available from Kureha Chemical Industry Co., Ltd. in Japan under the trade name of KF 1300 were dissolved in 50 mL of the N-methylpyrrolidon. 12 g of ethylene carbonate and 1 g of fumed silica were added thereto, followed by homogenously mixing to form a resultant solution. Subsequently, the resultant solution was cast on a Mylar film to a thickness of 30 μm using a doctor blade. Next, the cast resultant product was dried using hot moving air to remove the N-methylpyrrolidon. A dried film consisting of PVC and polyvinylidenefluoride (PVDF) was removed from the Mylar film, thereby preparing a separator film according to yet another embodiment of the present invention. The prepared separator film was subjected to a 1 hour extraction step using methanol to remove the ethylene carbonate to produce a separator.

When using a mixture of PVC and PVDF, the mechanical strength of the resulting film is improved.

EXAMPLE 10

1 g of the PVC having a weight-average molecular weight of 60,000, 1 g of KYNAR 2801 (a vinylidenefluoride 78 wt %/hexafluoropropylene 22 wt % copolymer) and 1 g of the PVDF available from Kureha Chemical Industry Co., Ltd. in Japan under the trade name of KF 1300 were dissolved in 40 mL of the N-methylpyrrolidon. 4 g of ethylene carbonate and 3 g of fumed silica were added thereto, followed by homogenously mixing to form a resultant solution. Subsequently, the resultant solution was cast on a Mylar film to a thickness of 30 μm using a doctor blade. Next, the cast resultant product was dried using hot moving air to remove the N-methylpyrrolidon. A dried film consisting of PVC, PVDF, and a copolymer of vinylidenefluoride and hexafluoropropylene was removed from the Mylar film, thereby preparing a separator according to the present invention.

Charging/discharging characteristics of a lithium secondary battery using the separator film prepared in Example 9 were examined at various rates and temperatures, and the test results are shown in FIG. 1 and Table 1. The lithium secondary batteries was prepared according to the follow method. First, 94 g of $LiCoO_2$, 3 g of Super P conductive carbon, and 3 g of polyvinylidenefluoride (PVDF) were dissolved in N-methyl-2-pyrrolidone to produce a cathode active material slurry. Then, an aluminum (Al) foil having a width of 4.9 cm and a thickness of 147 microns was coated with the cathode active material slurry, dried, rolled, and cut into a predetermined size to prepare a cathode.

90 g of mezocarbon fiber (MCF, available from Petoca, Ltd.), 0.2 g of oxalic acid, and 10 g of PVDF were dissolved in N-methyl-2-pyrrolidone to produce an anode active material slurry. Then a copper (Cu) foil having a width of 5.1 cm and a thickness of 178 microns was coated with the anode active material slurry, dried, rolled, and cut into a predetermines size to prepare an anode.

A separator manufactured in Example 9 was interposed between the cathode and anode and wound to prepare an electrode assembly. The electrode assembly was put into a battery case and then an electrolyte solution was injected into the battery case under reduced pressure, thereby completing a lithium secondary battery. Here, an electrolyte solution obtained by dissolving 1.3 M $LiPF_6$ in a solvent of ethylene carbonate (EC) and diethyl carbonate (DEC) in a mixture ratio of 3:7 by weight was used as the electrolytic solution.

TABLE 1

| Separator | Standard charge/discharge capacity* (mAh) | | 0.5C (25° C.) | 1C (25° C.) | 2C (25° C.) | 2C (−20° C.) | Electrolytic solution |
|---|---|---|---|---|---|---|---|
| PVDF-PVC | 51.8 | 44.5 | 44.7 | 42.4 | 29.3 | 25.7 | 1.3 M $LiPF_6$ in EC/DEC (3:7) |
|  | 55.8 | 51.2 | 50.3 | 48.4 | 32.1 | 28.9 |  |
|  | 50.5 | 46.8 | 46.9 | 44.9 | 25.9 | 24.3 |  |
|  | 50.0 | 44.7 | 45.0 | 42.9 | 28.3 | 29.6 |  |
|  | 50.2 | 47.2 | 46.9 | 44.5 | 29.6 | 27.4 |  |
| Average | 51.7 | 46.9 | 46.8 (99.8%)# | 41.6 (95.1%)# | 29.0 (61.8%)# | 27.2 (57.9%)# |  |
| PE | 49.8 | 48.6 | 47.9 (98.5%)# | 46.2 (95.1%)# | 29.4 (60.1%)# | 25.9 (53.3%)# |  |

\*: 0.2C charge/0.2C discharge (4.2–2.75 V) formation conditions.
: Percentages are relative to the standard conditions.

Referring to FIG. 1 and Table 1, it is confirmed that the charge/discharge capacities of separators according to the present invention are better than those of a conventional PE separator, at 2C and −20° C. conditions.

As shown in FIG. 2, a lithium secondary battery according to an embodiment of the present invention includes a case 1 containing a positive electrode 3, a negative electrode 4, and a separator 2 interposed between the positive electrode 3 and the negative electrode 4. The separator 2 includes a matrix comprising either polyvinylchloride or a mixture of polyvinylchloride and at least one polymer selected from the group consisting of polyvinylidenefluoride, a vinylidenefluoride/hexafluoropropylene copolymer, polymethacrylate, polyacrylonitrile and polyethyleneoxide.

The separators according to the present invention have better ionic conductivity and higher mechanical strength than the conventional separator made of a porous polyethylene film. When the separators according to the present invention are used in a winding-type lithium secondary batteries having gel-type polymer electrolytes, the batteries have good high-rate charge/discharge capacity.

While this invention has been particularly shown and described with reference to preferred embodiments thereof, it will be understood by those skilled in the art that various changes in form and details may be made therein without departing from the spirit and scope of the invention as defined by the accompanying claims and equivalents thereof.

What is claimed is:

1. A lithium battery comprising:
   a cathode including an electrochemically active material;
   an anode including a material into which lithium ions intercalate; and
   a gel type polymer electrolyte through which the lithium ions move between said anode and cathode, the gel type polymer electrolyte comprising an electrolyte and a separator, the separator having a matrix comprising a mixture of polyvinylchloride and at least one polymer selected from the group consisting of polyvinylidenefluoride, a vinylidenefluoride/ hexafluoropropylene copolymer, polymethacrylate, polyacrylonitrile and polyethyleneoxide, wherein the matrix is made by
- dissolving the mixture of polyvinylchloride and the at least one polymer in a solvent to form a resultant product for casting;
- casting the resultant product on a support body;
- drying the cast resultant product to remove the solvent used for casting so as to form a film on the support body; and
- separating the film from the support body.

2. The lithium battery of claim 1, wherein the lithium battery comprises a wound lithium battery.

3. The lithium battery of claim 1, wherein the matrix further includes an inorganic filler to increase a mechanical strength and an ionic conductivity of the separator.

4. The lithium battery of claim 1, wherein the matrix further includes $Al_2O_3$ or $Li_2CO_3$ so as to increase a high-rate charge/discharge capacity and a battery performance at low temperatures.

5. The lithium battery of claim 1, wherein the separator includes pores holding the electrolyte.

6. The lithium battery of claim 1, wherein the separator includes a plasticizer mixed with the electrolyte such that the electrolyte is dispersed in the separator.

* * * * *